Feb. 5, 1963  H. A. C. HOGG ETAL  3,076,909
ELECTROSTATIC FOCUSSING DEVICES
Filed June 3, 1960
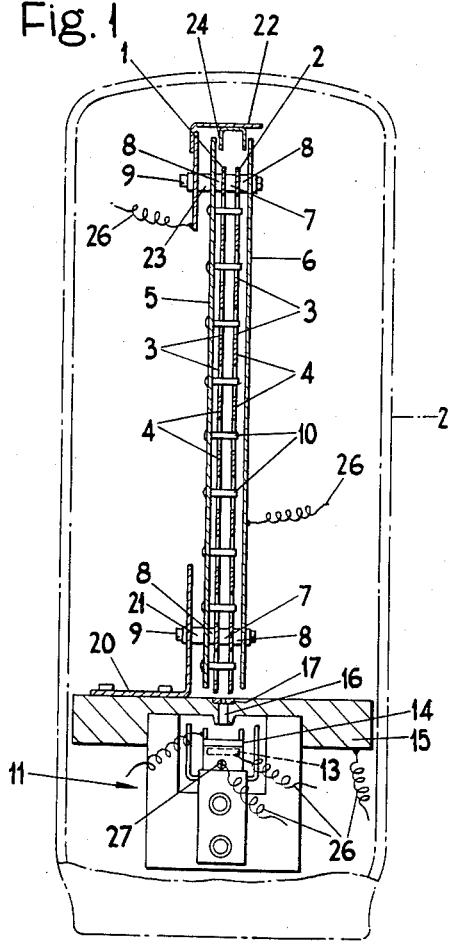
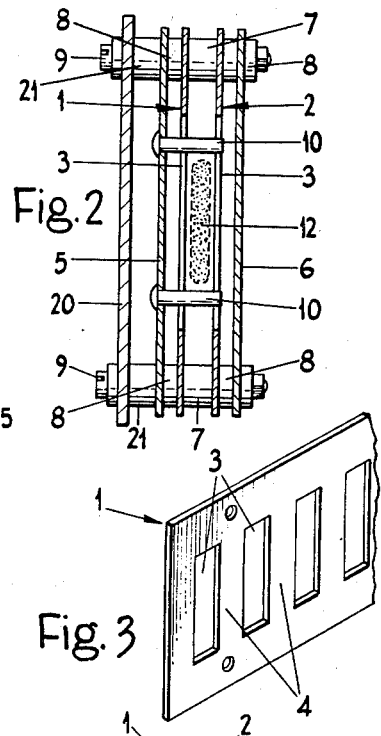
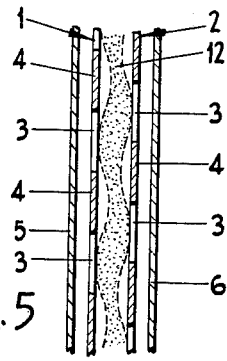
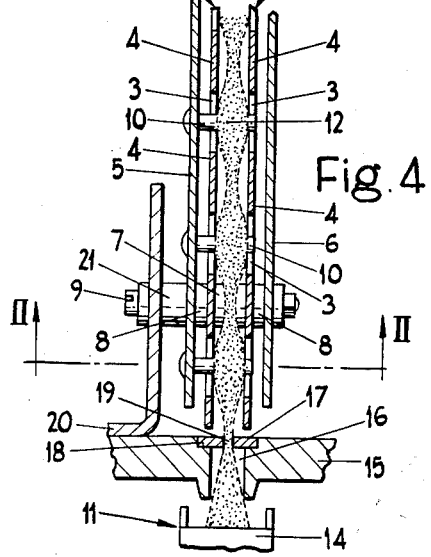
INVENTORS
HAROLD ALEXANDER CECIL HOGG
LAURENCE MICHAEL STEPHENSON
BY Kirschstein, Kirschstein & Ottinger
ATTORNEYS United States Patent Office 3,076,909
Patented Feb. 5, 1963

3,076,909
ELECTROSTATIC FOCUSSING DEVICES
Harold Alexander Cecil Hogg, Menlo Park, Calif., and Laurence Michael Stephenson, Leeds, England, assignors to The M-O Valve Company Limited, London, England, a British company
Filed June 3, 1960, Ser. No. 33,756
Claims priority, application Great Britain June 5, 1959
8 Claims. (Cl. 313—83)

This invention relates to electrostatic focussing devices.

According to the invention, an electrostatic focussing device includes a pair of periodic metal structures disposed with their lengths substantially parallel to each other so as to define between them a space through which an electron beam may travel, elements of one of the periodic structures being respectively disposed opposite at least parts of elements of the other periodic structure, and each structure being so constructed that the elements of the structure are permanently electrically connected together, and two further metal structures extending on either side of and electrically insulated from the pair of periodic structures so that each periodic structure lies between the other periodic structure and one of said further metal structures, the arrangement being such that, upon applying suitable potentials to the periodic metal structures and to the further metal structures so that each of the periodic structures is at a positive potential with respect to the further metal structures and upon projecting an electron beam in a suitable manner into said space at one end, the beam travels through said space generally in a direction parallel to the lengths of the structures, the beam having an undulatory form such that it alternately approaches and recedes from each periodic structure.

By a periodic metal structure is meant a series of metallic elements which are spaced apart along a given path (the length of the structure) and all of which extend in a similar manner transversely to said path. The elements may for example take the form of the teeth of one or more comb-like structures or the rungs of a ladder-like structure.

One arrangement in accordance with the present invention will now be described by way of example with reference to the accompanying drawings, in which:

FIGURE 1 is a side elevation, shown partly in section, of an electrostatic focussing device in accordance with the invention associated with an electron gun, the section being taken along the longitudinal axis of the focussing device;

FIGURE 2 is a sectional elevation of the focussing device, the section being taken along the line II—II of FIGURE 4;

FIGURE 3 is a perspective view of part of one of the periodic metal structures;

FIGURE 4 is an enlarged side elevation of a part of the focussing device illustrating its mode of operation; and FIGURE 5 is a diagrammatic side elevation of a part of a modified form of the focussing device illustrated in FIGURES 1 to 4.

Referring to FIGURES 1 to 4 of the drawings, the electrostatic focussing device includes two periodic structures which are respectively formed by a pair of parallel rectangular metal plates generally designated 1 and 2, each having a length of 10.6 centimetres, a width of 3.8 centimetres and a thickness of 0.025 centimetre. The plates 1 and 2 are spaced apart by a distance of 0.25 centimetre and are arranged so that their peripheries are in register. Each of the plates 1 and 2 has a series of nine rectangular apertures 3 formed in it, all the apertures 3 being similar in size and having a width of 0.56 centimetre and a length of 2.1 centimetres. The apertures 3 are spaced apart by distances equal to their widths with their long edges parallel and with corresponding ends in register, and the arrangement of the two plates 1 and 2 is such that the elements 4 formed between the apertures 3 of one plate 1 or 2 are in register with the elements 4 formed between the apertures 3 of the other plate 2 or 1.

A pair of solid parallel metal plates 5 and 6 having approximately the same overall dimensions as the plates 1 and 2 are disposed on either side of and parallel to the plates 1 and 2, each of the plates 5 and 6 being disposed 0.127 centimetre from the adjacent apertured plate 1 or 2. The plates 1 and 2 are spaced apart by means of a number of ceramic washers 7, and are spaced f om, and electrically insulated from, the plates 5 and 6 by means of a number of further ceramic washers 8, the assembly of the four plates 1, 2, 5 and 6 being held together by means of bolts 9 which pass through the washers 7 and 8 and through holes in the plates 1, 2, 5 and 6.

A number of metal pins 10, each 0.15 centimetre in diameter, are secured to the plate 5. The arrangement is such that a pair of pins 10 project through each aperture 3 of the adjacent apertured plate 1, each pair of pins 10 being symmetrically disposed with respect to the relevant aperture 3, being spaced 1.53 centimetres apart, and projecting across the whole of the gap between the plates 1 and 2.

The focussing device is associated with an electron gun generally designated 11 which is designed to produce a narrow electron beam 12 of approximately rectangular cross-section. The gun 11 includes an indirectly heated cathode 13, a focussing electrode 14 electrically connected to the cathode 13, and an anode plate 15 having formed in it an aperture 16 of rectangular cross-section the longer dimension of which is parallel to the lengths of the apertures 3 in the plates 1 and 2. A molybdenum insert 17 is secured in a recess 18 (see FIGURE 4) formed in that main face of the anode plate 15 remote from the cathode 13, the insert 17 having formed in it a rectangular slot 19 which also extends in a direction parallel to the lengths of the apertures 3. In operation, the electron beam 12 passes through the aperture 16 and the slot 19, the length of the slot 19 being approximately equal to the width of the beam 12 as it emerges from the gun 11.

The pair of plates 1 and 2 define a space through which the electron beam 12 can travel, and are disposed with corresponding ends adjacent the slot 19, these ends being symmetrically disposed with respect to the long edges of the slot 19. The assembly of the plates 1, 2, 5 and 6 is secured to the anode plate 15 by means of an L-shaped bracket 20, the bracket 20 being secured to the assembly of the plates 1, 2, 5 and 6 by means of two of the bolts 9; the plate 20 is spaced from and electrically insulated from the plate 5 by means of further ceramic washers 21.

The plates 1 and 2 are electrically connected together and to the anode plate 15, and the plates 5 and 6 are also electrically connected together.

The focussing device is also associated with a collector electrode 22 disposed adjacent that end of the assembly of the plates 1, 2, 5 and 6 remote from the anode plate 15, the collector electrode 22 being secured to the assembly of the plates 1, 2, 5 and 6 by means of two of the bolts 9, and being spaced from and electrically insulated from the plate 5 by means of further ceramic washers 23. The collector electrode 22 includes a U-shaped member 24 the inner surface of the base of which faces the anode plate 15 and the arms of which are approximately in register with the plate 1 and 2.

The combination of the focussing device, the electron gun 11 and the collector electrode 22 is mounted in an evacuated glass envelope schematically indicated 25, electrical leads 26 for the anode 15, the cathode 13, the heater 27 of the cathode 13, the focussing electrode 14, the plates 5 and 6, and the collector electrode 22 being sealed through the wall of the envelope 25.

In one set of operating conditions, the anode 15 is earthed, a negative potential of about 800 volts is applied to the cathode 13 and a negative potential of about 690 volts is applied to the plates 5 and 6. A positive potential of up to 50 volts is applied to the collector electrode 22. The electrostatic focussing device effectively forms a series of electrostatic lenses spaced apart along the length of the focussing device. The electrostatic field distribution along the general direction of travel of the electron beam 12 between the plates 1 and 2 is such that there is an overall focussing action upon the beam 12 in directions perpendicular to the plates 1 and 2. The effect of this field on the beam 12 is such that the beam 12 has an undulatory form (as illustrated in FIGURE 4), the thickness of the beam 12 (that is to say that dimension of the beam 12 perpendicular to the plates 1 and 2) varying as it travels along the length of the plates 1 and 2, through the axis of the beam 12 is straight and disposed parallel to, and midway between, the longitudinal axes of the plates 1 and 2. The form of the beam 12 is such that two series of peaks are respectively formed on opposite sides of the beam 12, each series of peaks being disposed in the vicinities of the apertures 3 of the adjacent plate 1 or 2. Thus, the beam 12 alternately approaches and recedes from each of the plates 1 and 2 until the beam 12 is incident upon the collector electrode 22.

It is found that, in the arrangement described above, there is little dispersion of the electrons in the electron beam 12 in directions perpendicular to the plates 1 and 2, while lateral dispersion of the beam 12 in directions parallel to the plates 1 and 2 is largely inhibited by virtue of the two series of pins 10; it is found that about 80% of the electrons passing through the slot 19 are collected by the collector electrode 22.

Referring now to FIGURE 5, in an alternative arrangement to that described above the plates 1 and 2 are displaced slightly with respect to each other so that the elements 4 of one of the plates 1 and 2 are staggered with respect to those of the other of the plates 1 and 2, half of each element 4 of the plate 1 being disposed opposite an element 4 of the plate 2 while the remaining half of the former element 4 is disposed opposite an aperture 3 of the plate 2. In this alternative arrangement, the axis of the electron beam 12 follows an undulatory path as the beam 12 travels along the gap between the plates 1 and 2, the axis of the beam 12 alternately approaching and receding from each of the plates 1 and 2. The beam 12 again has two series of peaks formed on opposite sides of it, each series of peaks being disposed in the vicinities of the apertures 3 of the adjacent plate 1 or 2. A good transmission ratio is also obtained in this alternative arrangement, with again about 80% of the electrons passing through the slot 19 being collected by the collector electrode 22.

In further alternative arrangements, it may be possible for the period of one of the periodic metal structures to be different from that of the other periodic metal structure.

It should be understood that an electrostatic focussing device in accordance with the invention could be incorporated in a travelling wave tube, with at least one of the periodic structures forming at least part of a delay device along which an electromagnetic wave may be propagated so as to interact with an electron beam arranged to travel along the space defined by the periodic structures in a direction generally parallel to the lengths of the structures. If the arrangement were adapted for use as a backward wave oscillator, means would be provided for extracting radio frequency energy from the oscillator at that end of the pair of periodic structures adjacent the electron gun, while if the arrangement were adapted for use as an amplifier, means would be provided for applying a radio frequency signal to one end of the pair of periodic structures and for taking an output from the other end of the periodic structures.

One requirement of a travelling wave tube is that some form of focussing arrangement must be provided in order to prevent the electron beam from diverging unduly along the length of the tube; for example, in the case of a travelling wave tube employing a helix as a delay device, such focussing is commonly achieved by means of electromagnets arranged so that there is a strong magnetic field directed along the axis of the helix. The transmission ratio of each of the focussing devices described above is sufficient for satisfactory operation of a travelling wave tube incorporating such a device, and thus it will be appreciated that the present invention provides a convenient means for focussing an electron beam in a travelling wave tube.

Also, in order to achieve maximum interaction between the electron beam and the electromagnetic wave in a travelling wave tube, the beam should pass as close as possible to the gaps in the periodic structure or structures forming the delay device since the axial electric field of the electromagnetic wave is at a maximum in the regions of these gaps. This requirement is especially important in backward wave oscillators since the space-harmonics of the field of the electromagnetic wave decay more rapidly away from the periodic structure or structures than the fundamental component of the field and, in such a device, the electron beam is usually arranged to interact with a reverse space harmonic of the field; by a reverse space harmonic is meant a space harmonic whose phase and group velocities are directed in opposite senses. The achievement of such maximum interaction however involves certain difficulties. For example, where the electron beam travels in a rectilinear direction the gaps in the periodic structure or structures are shielded from the electron beam by the elements between which the gaps are formed. Such shielding may be reduced by making each element very thin in a direction perpendicular to the direction of travel of the electron beam, but in such a case the periodic structure or structures will be relatively mechanically weak and will have a low thermal capacity so that distortion or even melting of the elements may occur.

The present invention enables such difficulties to be alleviated by incorporating in a travelling wave tube a focussing device in accordance with the invention in which in operation a set of peaks of the beam are respectively disposed in the vicinities of the gaps in each periodic structure; it will be appreciated that in such a travelling wave tube, in operation each peak of the undulatory beam coincides with a region of maximum axial electric field so that there is very good interaction between the electron beam and the electromagnetic wave without the necessity of making the elements forming the periodic structures very thin.

We claim:

1. An electrostatic focussing device including a pair of periodic metal structures disposed with their lengths substantially parallel to each other so as to define between them a space through which an electron beam may travel, elements of one of the periodic structures being respectively disposed opposite at least parts of elements of the other periodic structure, and each structure being so constructed that the elements of the structure are permanently electrically connected together, and two further metal structures extending on either side of and electrically insulated from the pair of periodic structures so that each periodic structure lies between the other periodic structure and one of said further metal structures, the arrangement being such that, upon applying suitable potentials to the periodic metal structures and to the further metal structures so that each of the periodic structures is at a positive potential with respect to the further metal structures and upon projecting an electron beam in a suitable manner into said space at one end, the beam travels through said space generally in a direction parallel to the lengths of the structures, the beam having an undulatory form such that it alternately approaches and recedes from each periodic structure.

2. An electrostatic focussing device according to claim 1, in which the elements of one of the periodic structures are respectively substantially in register with the elements of the other periodic structure.

3. An electrostatic focussing device according to claim 1, in which the elements of one of the periodic structures are staggered with respect to the elements of the other periodic structure so that parts of the elements of one of the periodic structures are respectively disposed opposite parts of the gaps of the other periodic structure.

4. An electrostatic focussing device according to claim 1, in which the periodic structures are each in the form of an elongated metal plate, the gaps of each periodic structure being in the form of slots extending perpendicularly to the length of the relevant plate.

5. An electrostatic focussing device according to claim 4, in which said further metal structures are in the form of metal plates which are respectively spaced by equal amounts from the adjacent periodic structures.

6. An electrostatic focussing device according to claim 5, in which the periodic structures are electrically connected together, and in which said further metal structures are also electrically connected together.

7. An electrostatic focussing device according to claim 1, including means for inhibiting lateral dispersion of the beam as the beam travels through said space.

8. An electrostatic focussing device according to claim 7, in which said means takes the form of two series of metal pins which are electrically connected to one of said further metal structures and which extend through the gaps in the adjacent periodic structure, the two series of pins being spaced apart in a direction perpendicular to the length of each periodic structure and being so arranged that in operation the beam travels between the two series of pins.

References Cited in the file of this patent

UNITED STATES PATENTS

| | | |
|---|---|---|
| 2,857,548 | Kompfner et al. | Oct. 21, 1958 |
| 2,899,597 | Kompfner | Aug. 11, 1959 |
| 2,951,964 | Quate | Sept. 6, 1960 |
| 2,973,453 | Hogg | Feb. 28, 1961 |